(12) United States Patent
Nguyen Hoang et al.

(10) Patent No.: US 9,386,655 B2
(45) Date of Patent: Jul. 5, 2016

(54) LIGHT SENSOR DEVICE AND MANUFACTURING METHOD

(75) Inventors: Viet Nguyen Hoang, Leuven (BE); Radu Surdeanu, Roosbeek (BE); Pascal Bancken, Opwijk (BE); Benoit Bataillou, Lyons (FR); David Van Steenwinckel, Holsbeek (BE)

(73) Assignee: NXP B.V., Eindhoven (NL)

( * ) Notice: Subject to any disclaimer, the term of this patent is extended or adjusted under 35 U.S.C. 154(b) by 301 days.

(21) Appl. No.: 12/994,650

(22) PCT Filed: May 21, 2009

(86) PCT No.: PCT/IB2009/052139
§ 371 (c)(1), (2), (4) Date: Feb. 22, 2011

(87) PCT Pub. No.: WO2009/144645
PCT Pub. Date: Dec. 3, 2009

(65) Prior Publication Data
US 2011/0133214 A1    Jun. 9, 2011

(30) Foreign Application Priority Data

May 27, 2008 (EP) .................................... 08104120
Jun. 2, 2008 (EP) .................................... 08104203

(51) Int. Cl.
*H01L 29/49* (2006.01)
*H05B 33/08* (2006.01)
*G01J 1/02* (2006.01)
*G01J 1/04* (2006.01)

(Continued)

(52) U.S. Cl.
CPC ............... *H05B 33/0869* (2013.01); *G01J 1/02* (2013.01); *G01J 1/0209* (2013.01); *G01J 1/04* (2013.01); *G01J 1/0407* (2013.01); *G01J 1/0425* (2013.01); *G01J 1/32* (2013.01); *H05B 33/0821* (2013.01); *G01J 2001/4247* (2013.01)

(58) Field of Classification Search
CPC ............ H05B 33/0869; H05B 33/0821; G01J 1/0407; G01J 1/0425
USPC ...................................... 257/432–436; 385/12
See application file for complete search history.

(56) References Cited

U.S. PATENT DOCUMENTS 7,646,943 B1 * 1/2010 Wober ............................. 385/12
2006/0267124 A1 * 11/2006 Yamazaki ...................... 257/432

(Continued)

FOREIGN PATENT DOCUMENTS

EP    0027072 A1    4/1981
EP    0305112 A2    3/1989

(Continued)

OTHER PUBLICATIONS

Webester's ninth New Collegiate Dictionary, copyright 1991 p. 826.*
International Search Report and Written Opinion for Application PCT/IB2009/052139 (Aug. 27, 2000).

*Primary Examiner* — Michael Shingleton

(57) ABSTRACT

A light sensor device comprises a substrate (10) having a well (12) defined in one surface. At least one light sensor (14) is formed at the base of the well (12), and an optical light guide (18) in the form of a transparent tunnel (18) within an opaque body (20) extends from a top surface of the device down a sloped side wall of the well (12) to the location of the light sensor (14).

8 Claims, 2 Drawing Sheets

(51) Int. Cl.
*G01J 1/32* (2006.01)
*G01J 1/42* (2006.01)

(56) References Cited

U.S. PATENT DOCUMENTS

2007/0290284 A1 12/2007 Shaffer
2009/0315131 A1* 12/2009 Hung et al. .................. 257/432
2010/0283112 A1* 11/2010 Tay .............................. 257/432
2011/0242350 A1* 10/2011 Sawayama ................. 348/222.1

FOREIGN PATENT DOCUMENTS

| | | |
|---|---|---|
| JP | 09083011 | 3/1997 |
| JP | 11120324 A | 4/1999 |
| JP | 200332614 | 11/2003 |
| JP | 2007207789 A | 8/2007 |
| WO | 2008/022438 A1 | 2/2008 |

* cited by examiner

LIGHT SENSOR DEVICE AND MANUFACTURING METHOD

This invention relates to light sensors, for example for use in lighting devices.

Lighting using solid-state devices such as LEDs is gaining momentum. The use of LEDs for lighting has several advantages over the use of conventional light sources, including a better light output/dimension ratio and improved power efficiency.

It has been recognised that during operation, the LED temperature increases and this influences the amount of light output of the LED as well as the dominant wavelength of the output light.

It has been recognised that either temperature measurement or optical analysis of the light output is desirable to provide feedback value for use in controlling the LED driver conditions. This feedback can compensate both for temperature dependent effects and for ageing of the LED.

For temperature compensation, the LED temperature can be measured using an external temperature sensor located close to the LED or an integrated temperature sensor.

It has also been proposed to measure the light output flux and colour temperature, and use these measurements to provide a compensation drive scheme. This can compensate both for temperature effects and ageing.

This invention relates generally to light sensors, and for example of the type which can be used for providing this feedback function. Typically, photodiodes are used for this purpose.

Currently, photodiodes are made on a planar silicon surface and very often are equipped with a lens on top to maximize the amount of incoming light. The viewing angle of the photodiode is therefore relatively large i.e. it can receive light coming from many different directions. Nevertheless, in some applications, it is preferable that the photodiode only responds to light coming from one specific direction with the viewing angle as small as possible. Adding a collimator in front of a photodiode is a known solution but this has the disadvantage of an increase in the overall size of the structure.

According to the invention, there is provided a light sensor device comprising:
a substrate having a well defined in one surface;
a light sensor formed at the base of the well; and
an optical light guide comprising a transparent tunnel within an opaque body, which tunnel extends from a top surface of the device down a sloped side wall of the well to the location of the light sensor.

This invention provides a light sensor structure with built-in light tunnel, which functions as a collimator that allows the device to only receive light from a specific direction.

The substrate preferably comprises silicon and the light sensor comprises a photodiode.

The tunnel can comprise a portion of a transparent layer provided over the surface of the well. This enables the collimator to be fabricated in a simple manner. The opaque body can also comprise a portion of an opaque layer provided over the transparent layer.

A plurality of light sensors can be formed at the base of the well, each having an associated light guide tunnel. This enables different sensors to be arranged for receiving light from different directions. The light guide tunnels can each comprise portions of the same transparent layer provided over the surface of the well. Thus, multiple directional light sensors can be fabricated with shared processing steps.

The invention also provides a display device comprising:
a plurality of LED pixels; and
a light sensor device of the invention for providing optical feedback signals for use in controlling the LED pixels.

The invention also provides a method of manufacturing a light sensor device, comprising:
forming a well in one surface of a substrate;
forming a light sensor at the base of the well; and
forming an optical light guide comprising a transparent tunnel within an opaque body, which tunnel extends from a top surface of the device down a sloped side wall of the well to the location of the light sensor.

The formation of a well means that the device is formed on a non-planar surface substrate (for example a silicon substrate).

In this method, the substrate is first processed to define the wells. The light sensor or sensors (e.g. photodiodes) are created at the bottom of the wells. The following steps define light guides leading to the optical window of the light sensors. The resulting structure is a light sensor with built-in collimator, which is able to generate a signal current when light from a specific direction is received through the optical window.

Forming the light guides can comprise forming a transparent layer over the surface of the well, patterning the transparent layer into tunnel sections, and forming an opaque layer over the transparent layer.

An example of the invention will now be described with reference to the accompanying drawings, in which:

FIG. 1 shows an example of the manufacturing process of an example of the invention; and FIG. 2 shows an example device of the invention.

The invention provides a light sensor device in which a light sensor is formed at the base of a well, and a transparent tunnel-shaped optical light guide extends from a top surface of the device down a sloped side wall of the well to the location of the light sensor.

Figure 1A:
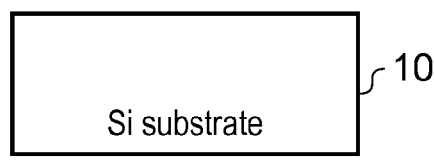
FIG. 1A shows the silicon substrate 10, which is the starting point of the manufacturing process.
Figure 1B:
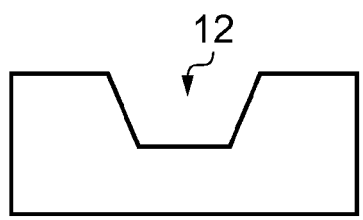
FIG. 1 shows an example of the manufacturing process of an example of the invention.

As shown in FIG. 1B, a cavity 12 is etched into the substrate, thereby defining a well.

Figure 1C:
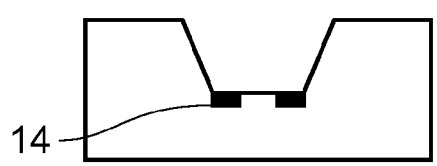

Subsequently, photodiodes 14 are created at the bottom of the well, using conventional deposition processes. This is shown in FIG. 1C. For example, PIN or NIP photodiodes can be formed, with the required contact metallization layers. The formation of the photodiode structures can be completely conventional.

Figure 1D:
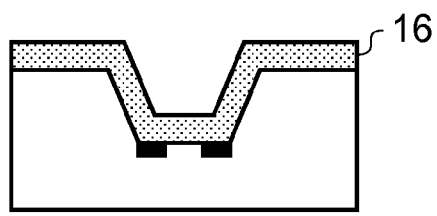

As shown in FIG. 1D, a layer of transparent material 16 is then deposited on top of the entire substrate surface, followed by a patterning step.

Figure 1E:
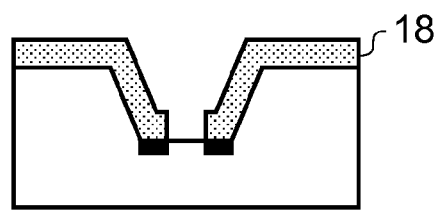
Figure 1E:
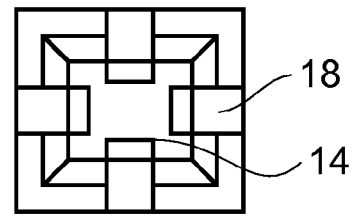
Figure 1F:
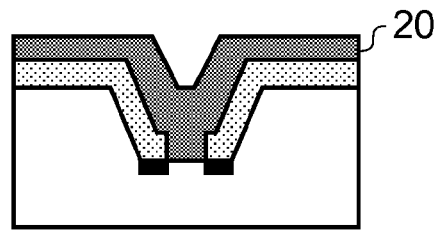
Figure 1F:
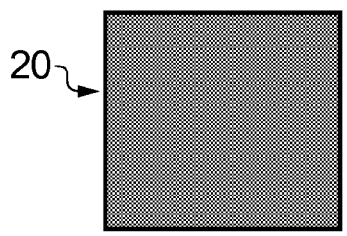
Figure 1G:
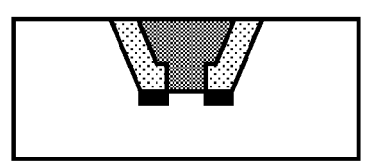
Figure 1G:
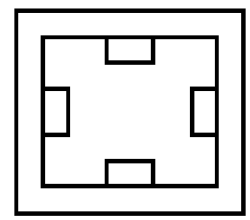

The patterning step gives rise to individual light guide channels 18, as shown in FIG. 1E. FIGS. 1E to 1G show the structure both in cross section and in plan view. The plan view shows four discrete light guide tunnels 18, each extending down to the top light-receiving surface of a respective photodiode 14.

Finally, a layer of opaque material 20 is deposited as shown in FIG. 1F to separate the light guides, so that they each comprise a transparent tunnel within an opaque body.

A removal step is used to remove surplus opaque material to give the final structure shown in FIG. 1G. This structure has tunnels which extend from a top surface of the device down a sloped side wall of the well 12 to the location of a respective light sensor.

The top surface is planar with the top surface of the substrate, with the well filled by the opaque layer. This defines a fully integrated light sensor structure.

With this structure, a photodiode has highest response to light rays that come in through the optical window parallel with the light guide channel. By choosing the transparent material and the opaque material appropriately, the reflection properties of the interface between the two materials can be designed to maximize the directional dependence of the photodiodes. This is achieved by avoiding reflections at the interface.

The choices for the transparent and opaque layers depend on the wavelength range that the photodiode is intended for. For visible light (400-nm-800-nm) SiO2 can be used as the transparent material and any CMOS compatible metal layer can be used as the opaque layer (for example Al, Cu, Ti, Ta, W or TiN, TaN).

A problem with using metal layers is that they are quite reflective, especially aluminium. To avoid the reflection on the light guide channel walls, a conditioning step in which roughening (e.g. dry etching) the light guide side-walls can be performed prior to the deposition of the metal layer.

Also, the reflection properties at the side-walls of the light guide channel can be mitigated by adding an additional layer with high light absorption ability and have reflective index higher than that of the light guide material. In this case, there will be no total reflection possible for light rays inside the light guide channel coming towards the channel side wall. All the light that escapes the channel will be absorbed by the supporting layer. The supporting layer should be deposited on top of (but after patterning) of the transparent layer.

The depth and sidewall slope of the well is defined by the etching method and the crystal orientation of the silicon substrate. In particular, the sidewall slope of the recess area can be different depending on what etching method is used. For anisotropic wet etching, the slope is determined by the crystal orientation of the silicon substrate, which is 54.74 degrees for the (111) plane with regard to the (100) plane. The substrate can be a (100) silicon substrate, and the edges of the cavity can be aligned with the (110) plane.

For Si etching using plasma etching (also known as dry etch) there is more freedom in adjusting the cavity sidewall slope. The slope is essentially determined by the chemistry of the etch gases and the competition between the two simultaneous processes: etch and side wall passivation.

The sidewall slope dictates the incident light angle to which the device is tuned. Thus, the slope of the side of the well and its depth can be adjusted to meet the required angle of incidence to the light sensor. The width of the light guide can also be adjusted, with a narrower light guide being sensitive to a narrower range of angles of incidence, but receiving a corresponding smaller amount of input light.

This light sensor structure of the invention can be used for applications that require differentiation of light signal from different directions. For example, in a LED module that contains LEDs of different colours, the embedded photodiodes can be used to measure the light intensity of each LED with a minimum interference from the neighbouring LEDs.

Figure 2:
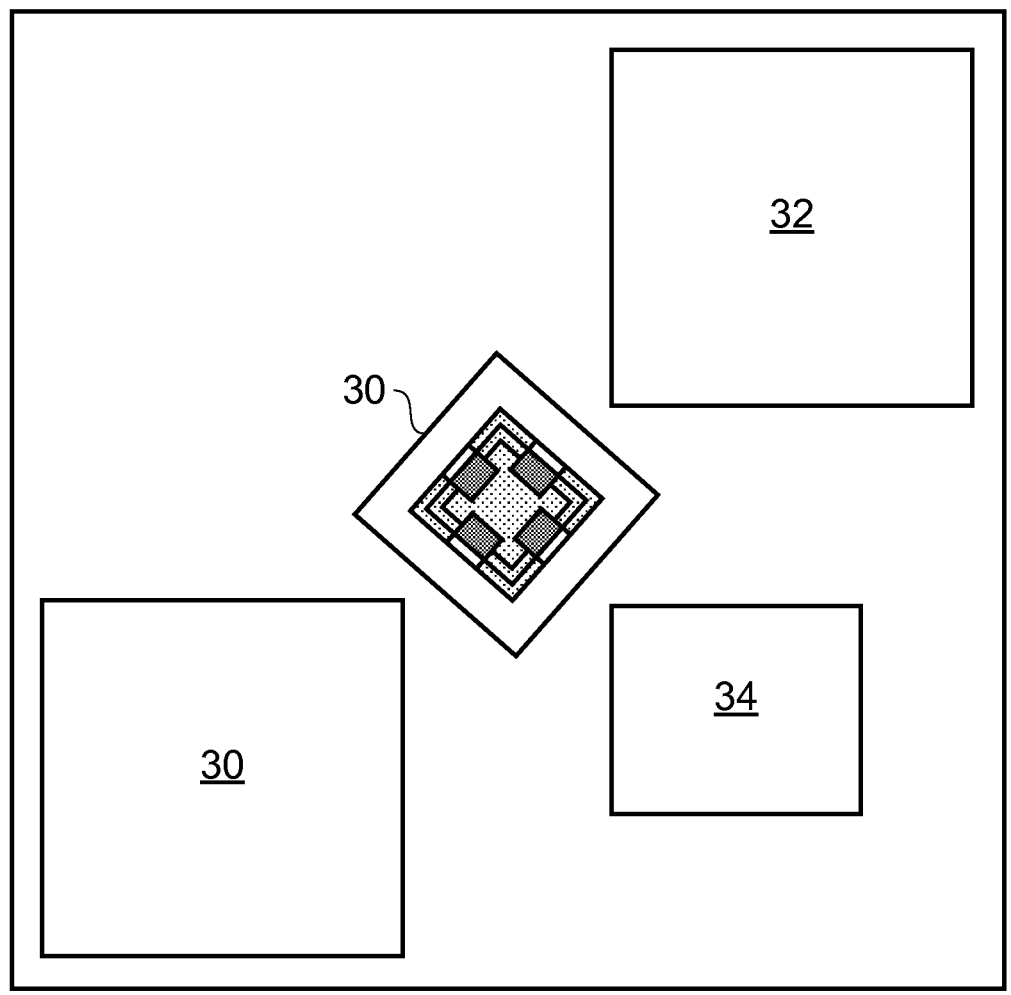

FIG. 2 shows this application of the invention, and shows a red LED 30, a green LED 32 and a blue LED 34, formed as an integrated unit. A light sensor device 36 of the type shown in FIG. 1 has three light sensors, each having the light guide tunnel oriented to receive light from a respective on of the LEDs. This allows individual LED performance to be monitored for the purposes of LED control, but avoids the need to use colour filters as part of the optical feedback scheme. The feedback then enables the complexity of the electronics used to drive the LEDs to be reduced, and therefore improves both cost and performance of the system.

A fourth light sensor can be used for ambient light sensing.

The use of optical feedback is known, as mentioned above, for the purposes of compensating for the effects of temperature and/or ageing on the LED output. Thus, LED light systems, including pixellated LED displays, represent one possible use of the light sensor system of the invention.

Another application is to detect location, distance and speed of a light source (for example the headlight of oncoming traffic).

The specific layers used have not been described in detail, as completely conventional materials and processing techniques can be employed.

Various other modifications will be apparent to those skilled in the art.

The invention claimed is:

1. A light sensor device comprising:
   a substrate having a well defined in one surface;
   a light sensor formed at a base of the well; and
   an optical light guide including a transparent tunnel within an opaque body, which tunnel extends from a top surface of the device down a sloped side wall of the well to the location of the light sensor,
   wherein the tunnel comprises a portion of a transparent layer provided over the surface of the well, and
   the opaque body comprises a portion of an opaque layer provided over the transparent layer.

2. A device as claimed in claim 1, wherein the substrate comprises silicon.

3. A device as claimed in claim 1, wherein the light sensor comprises a photodiode.

4. A device as claimed in claim 1, wherein a plurality of light sensors are formed at the base of the well, each having an associated light guide tunnel.

5. A device as claimed in claim 4, wherein the light guide tunnels each comprise portions of the same transparent layer provided over the surface of the well.

6. A method of manufacturing a light sensor device, comprising:
   forming a well in one surface of a substrate;
   forming a light sensor at a base of the well;
   forming an optical light guide comprising a transparent tunnel within an opaque body, which tunnel extends from a top surface of the device down a sloped side wall of the well to the location of the light sensor; and
   forming the light guide comprises forming a transparent layer over the surface of the well, patterning the transparent layer into tunnel sections, and forming an opaque layer over the transparent layer.

7. A method as claimed in claim 6, wherein the substrate comprises silicon and the light sensor comprises a photodiode.

8. A method as claimed in claim 6, comprising forming a plurality of light sensors at the base of the well, and an associated light guide tunnel for each light sensor, wherein the light guide tunnels each comprise portions of the same transparent layer provided over the surface of the well.

* * * * *